US012614879B2

(12) United States Patent
Nie

(10) Patent No.: US 12,614,879 B2
(45) Date of Patent: Apr. 28, 2026

(54) DATA CABLE AND ELECTRONIC DEVICE

(71) Applicant: VIVO MOBILE COMMUNICATION CO., LTD., Dongguan (CN)

(72) Inventor: Dongping Nie, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 335 days.

(21) Appl. No.: 18/373,960

(22) Filed: Sep. 27, 2023

(65) Prior Publication Data

US 2024/0022025 A1 Jan. 18, 2024

Related U.S. Application Data

(63) Continuation of application No. PCT/CN2022/082471, filed on Mar. 23, 2022.

(30) Foreign Application Priority Data

Mar. 30, 2021 (CN) ........................ 202110339779.X

(51) Int. Cl.
*H01R 13/6581* (2011.01)
*H01R 13/6471* (2011.01)

(52) U.S. Cl.
CPC ..... *H01R 13/6581* (2013.01); *H01R 13/6471* (2013.01)

(58) Field of Classification Search
CPC ........................ H01R 13/6581; H01R 13/6471
USPC ...................................................... 439/607.01
See application file for complete search history.

(56) References Cited

U.S. PATENT DOCUMENTS 10,170,845 B2 * 1/2019 Ju .......................... H01R 24/22
10,218,088 B2 * 2/2019 Chang ................ H01R 13/6586
10,741,941 B2 * 8/2020 Wu .................... H01R 43/0256
2005/0031268 A1 * 2/2005 Takeda ................. G02B 6/3839
385/71

(Continued)

FOREIGN PATENT DOCUMENTS

CN 201629411 U * 11/2010
CN 202050096 U 11/2011

(Continued)

OTHER PUBLICATIONS

International Search Report issued in corresponding International Application No. PCT/CN2022/082471, mailed Jun. 1, 2022, 4 pages.

(Continued)

*Primary Examiner* — Abdullah A Riyami
(74) *Attorney, Agent, or Firm* — IPX PLLC

(57) ABSTRACT

A data cable and an electronic device are provided. The data cable includes an AM connector, a Type C connector, and a connection cable. Both ends of the connection cable are respectively electrically connected to the AM connector and the Type C connector. The AM connector includes: a conductive housing and a rubber core. A power port pad, signal port pads, a grounding port pad, and a conductive fastener are provided on the rubber core. The grounding port pad is electrically connected to an inner grounding wire of the connection cable. The conductive fastener is connected to the grounding port pad, and the conductive fastener is in contact with the conductive housing.

18 Claims, 4 Drawing Sheets

(56) References Cited

U.S. PATENT DOCUMENTS

| | | | | |
|---|---|---|---|---|
| 2007/0141907 | A1* | 6/2007 | Kuo | H01R 13/65912 439/607.41 |
| 2010/0227502 | A1 | 9/2010 | Wu | |
| 2010/0258333 | A1* | 10/2010 | Horan | H01B 13/22 29/825 |
| 2012/0028496 | A1* | 2/2012 | Su | H01R 13/6581 439/607.41 |
| 2012/0071021 | A1* | 3/2012 | Wu | H01R 13/502 439/449 |
| 2016/0276789 | A1* | 9/2016 | Cheng | H01R 13/6275 |
| 2016/0322753 | A1* | 11/2016 | Cheng | H01R 13/631 |
| 2017/0093091 | A1* | 3/2017 | Cheng | H01R 24/62 |
| 2017/0221604 | A1* | 8/2017 | Pong | H01R 43/00 |
| 2018/0040969 | A1* | 2/2018 | Wu | H01R 12/596 |
| 2018/0052792 | A1* | 2/2018 | Cheng | H01R 4/023 |
| 2018/0097300 | A1* | 4/2018 | Tanaka | H01R 12/53 |
| 2018/0145425 | A1* | 5/2018 | Ju | H01R 13/6273 |
| 2018/0212366 | A1* | 7/2018 | Chang | H01R 13/405 |
| 2018/0366882 | A1* | 12/2018 | Tseng | H01R 13/02 |
| 2019/0296497 | A1* | 9/2019 | Chang | G06F 3/02 |

FOREIGN PATENT DOCUMENTS

| | | | | | |
|---|---|---|---|---|---|
| CN | 204103096 | U | * | 1/2015 | |
| CN | 206595497 | U | * | 10/2017 | H01R 43/0256 |
| CN | 206931771 | U | | 1/2018 | |
| CN | 209029645 | U | * | 6/2019 | |
| CN | 209515228 | U | | 10/2019 | |
| CN | 210040663 | U | * | 2/2020 | |
| CN | 210957134 | U | * | 7/2020 | |
| CN | 212085354 | U | * | 12/2020 | |
| CN | 113067207 | A | | 7/2021 | |
| KR | 20170077553 | A | | 7/2017 | |

OTHER PUBLICATIONS

First Office Action issued in related Chinese Application No. 202110339779.X, mailed Aug. 2, 2022, 9 pages.

* cited by examiner

DATA CABLE AND ELECTRONIC DEVICE

CROSS-REFERENCE TO RELATED APPLICATIONS

This application is a continuation of International Application No. PCT/CN2022/082471, filed Mar. 23, 2022, which claims priority to Chinese Patent Application No. 202110339779.X, filed Mar. 30, 2021. The entire contents of each of the above-referenced applications are expressly incorporated herein by reference.

TECHNICAL FIELD

This application relates to the field of communication technologies, and in particular to a data cable and an electronic device.

BACKGROUND

When transmitting a high-frequency signal, a connector needs a complete metal shielding housing to prevent the high-frequency signal from radiating in the form of an electromagnetic wave, and the metal shielding housing is to be grounded to achieve a best effect. A data cable is usually wrapped with copper coil, an external grounding wire is reflexed, and then the data cable is connected to an iron housing, to achieve short circuit. A Type-C connector is usually used. To prevent a port from being burnt caused by foreign matter entering the port, an open circuit structure or a short circuit through capacitor grounding is usually used.

However, in current technologies, a connection cable between a Type-A male (AM) connector and the Type C connector is to be twisted first, then tinned to prevent dispersion, and wrapped with copper foil, and a grounding wire is reflexed. After the connection cable is riveted and pressed, tin is to be added manually to ensure welding stability. This needs a lot of labor time and has high costs. To prevent short circuit between a power cable (Vbus) and the iron housing at a Type-C port, an open circuit is required for the iron housing, and an external grounding wire is to be cut off manually. This needs extra labor time and high costs. In addition, the grounding wire or weaving of the connection cable only serves grounding with an AM port, with a little loop current, and costs are to be increased.

SUMMARY

Embodiments of this application are intended to provide a data cable and an electronic device.

According to a first aspect, an embodiment of this application provides a data cable. The data cable includes: an AM connector, a Type C connector, and a connection cable. Two ends of the connection cable are respectively electrically connected to the AM connector and the Type C connector, and the AM connector includes:

a conductive housing and a rubber core.

A power port pad, a signal port pad, a grounding port pad, and a conductive fastener are disposed on the rubber core, and the grounding port pad is electrically connected to an inner grounding wire of the connection cable.

The conductive fastener is connected to the grounding port pad, and the conductive fastener is in contact with the conductive housing.

According to a second aspect, an embodiment of this application further provides an electronic device. The electronic device includes an electronic device body and the foregoing data cable.

The data cable is removably connected to the electronic device body.

In this embodiment of this application, a conductive fastener is increased on an AM connector. The conductive fastener is connected to a grounding port pad on a rubber core, to achieve a grounding effect of the AM connector. The conductive fastener is in contact with a metal housing of the AM connector, to implement short circuit between the AM connector and the conductive fastener. Therefore, the external grounding wire is not to be twisted and stained with tin at an AM port, so that working time may be reduced; no copper foil is to be wrapped at the AM port, so that a material and working time may be reduced; and no tin is to be increased manually after riveting and pressing to ensure stability of AM contact, so that working time may be reduced.

DETAILED DESCRIPTION

The following clearly describes technical solutions in embodiments of this application with reference to accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

Terms "first", "second", and the like in this specification and claims of this application are used to distinguish between similar objects instead of describing a specific order or sequence. It should be understood that data used in such way are interchangeable in a proper circumstance, so that the embodiments of this application can be implemented in an order other than the order illustrated or described herein. Objects classified by "first", "second", and the like are usually of a same type, and the number of objects is not limited. For example, there may be one or more first objects. In addition, in this specification and the claims, "and/or" represents at least one of connected objects, and a character "I" generally represents an "or" relationship between associated objects.

Figure 1:
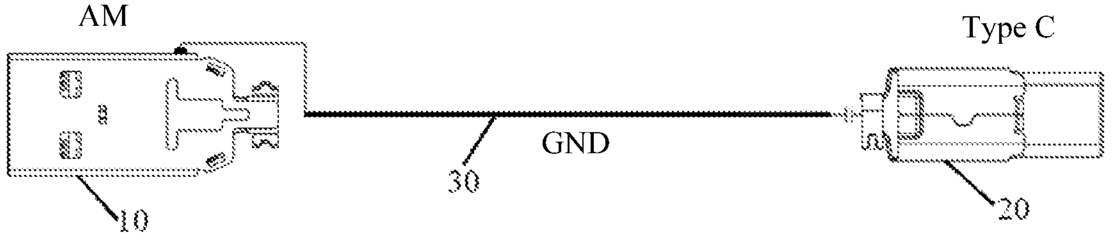
FIG. 1 shows a schematic diagram of a structure of a data cable according to an embodiment of this application.
Figure 2:
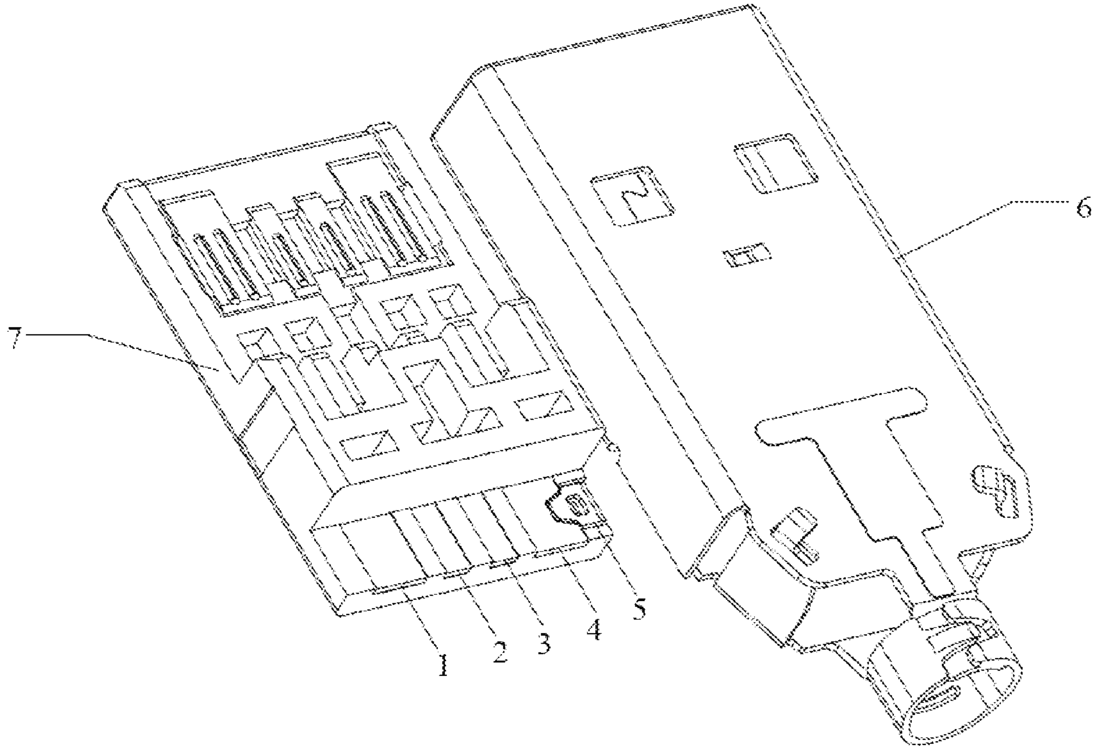
FIG. 2 shows a first schematic diagram of a structure of an AM connector of a data cable according to an embodiment of this application.

With reference to the accompanying drawings, the following describes in detail the data cable in the embodiments of this application based on embodiments and application scenarios for the embodiments As shown in FIG. 1 and FIG. 2, an embodiment of this application provides a data cable. The data cable includes an AM connector 10, a Type C connector 20, and a connection cable 30. Two ends of the connection cable 30 are respectively electrically connected to the AM connector 10 and the Type C connector 20. The AM connector 10 includes:

a conductive housing 6 and rubber core 7.

A power port pad 1, signal port pads (2 is a signal D-terminal pad, and 3 is a signal D+ terminal pad), a grounding port pad 4, and a conductive fastener 5 are disposed on the rubber core 7. The grounding port pad 4 is electrically connected to an inner grounding wire of the connection cable.

The conductive fastener 5 is connected to the grounding port pad 4, and the conductive fastener 5 is in contact with the conductive housing 6.

In the embodiment of this application, a problem that the conductive housing 6 of the AM connector and an external grounding wire are grounded. By increasing the conductive fastener 5 beside the grounding port pad 4, the conductive fastener 5 is connected to the grounding port pad 4. The grounding port pad 4 is configured to weld the inner grounding wire of the connection cable. In this embodiment of this application, because the conductive fastener is connected to the grounding port pad 4, and the conductive fastener 5 is plated with weldable nickel. When the inner grounding wire is welded, the grounding port pad and the conductive fastener may be welded simultaneously. This does not increase working time. In addition, the conductive fastener 5 is further in contact with the conductive housing 6. Therefore, the conductive housing 6 and the conductive fastener 5 are short-circuited. This prevents a wire from being wrapped with copper foil, the grounding wire is to be reflexed, and tin is added for welding, reducing working time.

Figure 3:
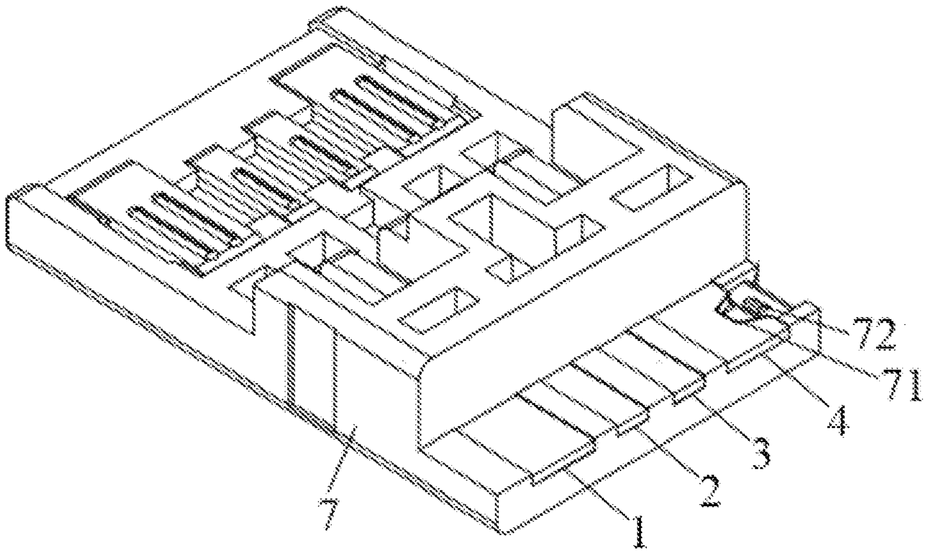
FIG. 3 shows a second schematic diagram of a structure of an AM connector of a data cable according to an embodiment of this application.
Figure 4:
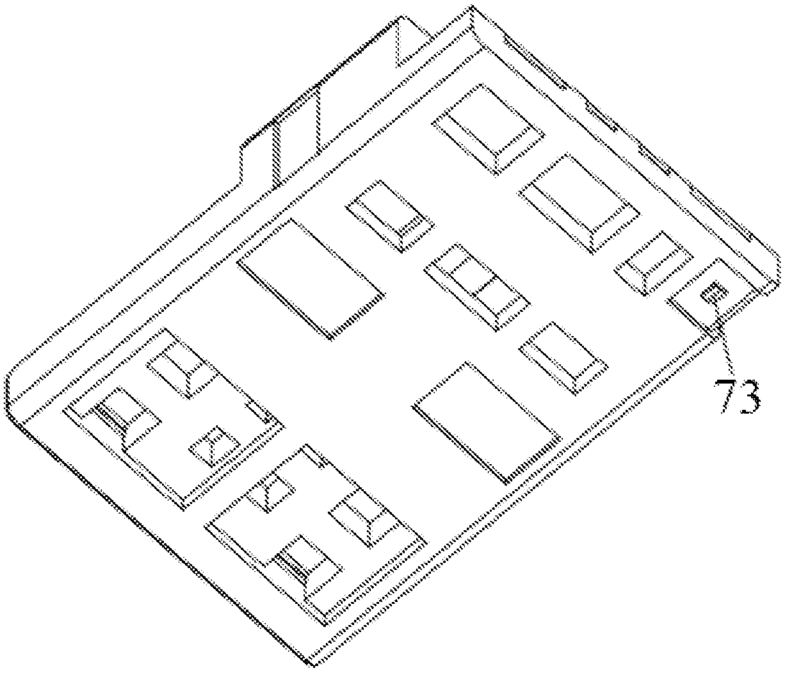
FIG. 4 shows a third schematic diagram of a structure of an AM connector of a data cable according to an embodiment of this application.
Figure 5:
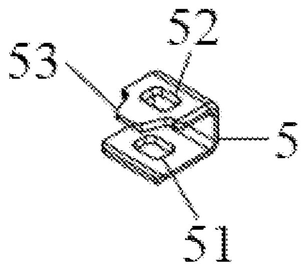
FIG. 5 shows a schematic diagram of a structure of a metal fastener of an AM connector in a data cable according to an embodiment of this application.

In at least one embodiment of this application, as shown in FIG. 3, FIG. 4, and FIG. 5, a first groove 71 is disposed at the grounding port pad 4, a clamping part 53 is disposed on the conductive fastener 5, and the clamping part 53 is clamped in the first groove. In other words, a part of the grounding port pad 4 is concave, and a part of the conductive fastener 5 protrudes to a concave part of the grounding port pad 4.

In at least one embodiment of this application, as shown in FIG. 5, the conductive fastener is of a U-shaped structure, and the conductive fastener includes:

a first surface and a second surface that are disposed opposite to each other. The first surface and the second surface are respectively provided with through holes (51 and 52).

As shown in FIG. 3 and FIG. 4, protrusions (72 and 73) corresponding to the through holes are further disposed on the rubber core. The through holes match the protrusions to dispose the conductive fastener on the rubber core.

In other words, a through hole is disposed on each of the first surface and the second surface of the conductive fastener 5, and a protruding clamping position is disposed corresponding to a rubber core position of the AM connector, to fasten the conductive fastener.

In some embodiments, the protrusion is a plastic clamping point, and a size and a shape of the protrusion are corresponding to the through hole, which is not specifically limited herein.

In at least one embodiment of this application, the conductive fastener 5 further includes:

a third surface that connects the first surface and the second surface.

The third surface of the conductive fastener 5 is in contact with the conductive housing 6.

It should be noted that, because the conductive fastener 5 and the conductive housing 6 are both made of metal materials, the third surface of the conductive fastener 5 is connected to the conductive housing 6 by laser welding, to implement short circuit between the conductive fastener 5 and the conductive housing 6, and enable contact between the conductive fastener 5 and the conductive housing 6 to be stable.

In this embodiment of this application, a conductive fastener is increased on an AM connector. The conductive fastener is connected to the grounding port pad to achieve a grounding effect of the AM connector. The conductive fastener is also in contact with the conductive housing, to implement short circuit between the AM connector and the conductive fastener. Therefore, the external grounding wire is not to be twisted and stained with tin at an AM port, so that working time may be reduced; no copper foil is to be wrapped at the AM port, so that a material and working time may be reduced; and no tin is to be increased manually after riveting and pressing to ensure stability of AM contact, so that working time may be reduced.

Figure 6:
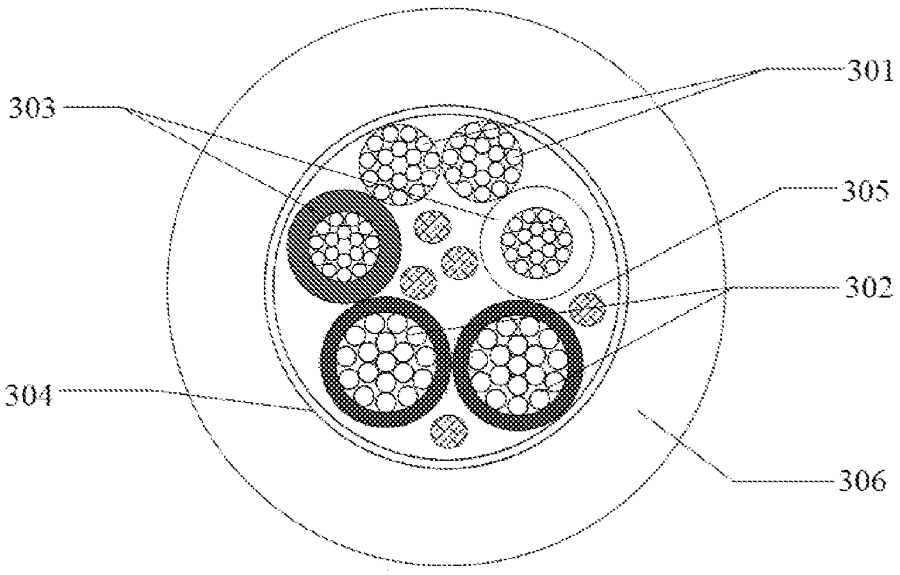
FIG. 6 shows a schematic diagram of a structure of a connection cable of data cable according to an embodiment of this application.

In at least one embodiment of this application, because the AM connector and a part grounded at the AM connector are short-circuited, no extra external grounding wire is required to provide a loop. Therefore, the external grounding wire may be canceled. This reduces material costs for the external grounding wire. Correspondingly, as shown in FIG. 6, the connection cable includes:

an aluminum foil layer 304 configured to shield an electromagnetic wave, where the aluminum foil layer is disposed around to form accommodation space; and two power cables 302, two signal cables 303, and two inner grounding wires 301 disposed in the accommodation space.

The power cables 302 are configured to provide a power supply, and the signal cables 303 are configured to transmit a USB signal. The inner grounding wires 301 are disposed between the two signal cables, and are respectively connected to the two signal cables and an inner surface of the aluminum foil. The inner grounding wires are configured to provide loop current for the power supply and provide a reference ground for the signal cables.

Correspondingly, in at least one embodiment of this application, the power port pad is electrically connected to the power cable of the connection cable; and the signal port pad is electrically connected to the signal cable of the connection cable.

In this embodiment of this application, because the external grounding wire of the connection cable is canceled, working time for which the external grounding wire or twisting is to be cut off manually at the Type-C port, and material costs for the external grounding wire are reduced.

In some embodiments of this application, as shown in FIG. 6, the connection cable further includes a nylon rope 305 disposed in the accommodating space. The nylon rope is configured to fill a gap in the accommodation space, to ensure that a wire is circular and increase a tension resistance capability and a swing resistance capability of the wire.

In some embodiments of this application, the connection cable further includes a wire outer sheath 306 that covers the aluminum foil layer. The wire outer sheath 306 is configured to protect an internal structure of the connection cable, functions as water resistance, and the like.

To sum up, in this embodiment of this application, because the conductive fastener is disposed at the AM connector, to implement short circuit between the AM connector and the conductive fastener, and achieve a grounding effect of the AM connector, during assembly of the data cable, no copper foil is to be wrapped on the AM connector and a riveting part of the wire, and the grounding wire is not to be reflexed to be welded with the conductive housing. Therefore, the external grounding wire is not to be twisted and stained with tin at an AM port, so that working time may be reduced; no copper foil is to be wrapped at the AM port, so that a material and working time may be reduced; and no tin is to be increased manually after riveting and pressing to ensure stability of AM contact, so that working time may be reduced; and no external grounding wire is provided for the Type-C port, and no action for cutting off the external grounding wire is performed, so that working time may be reduced.

Figure 7:
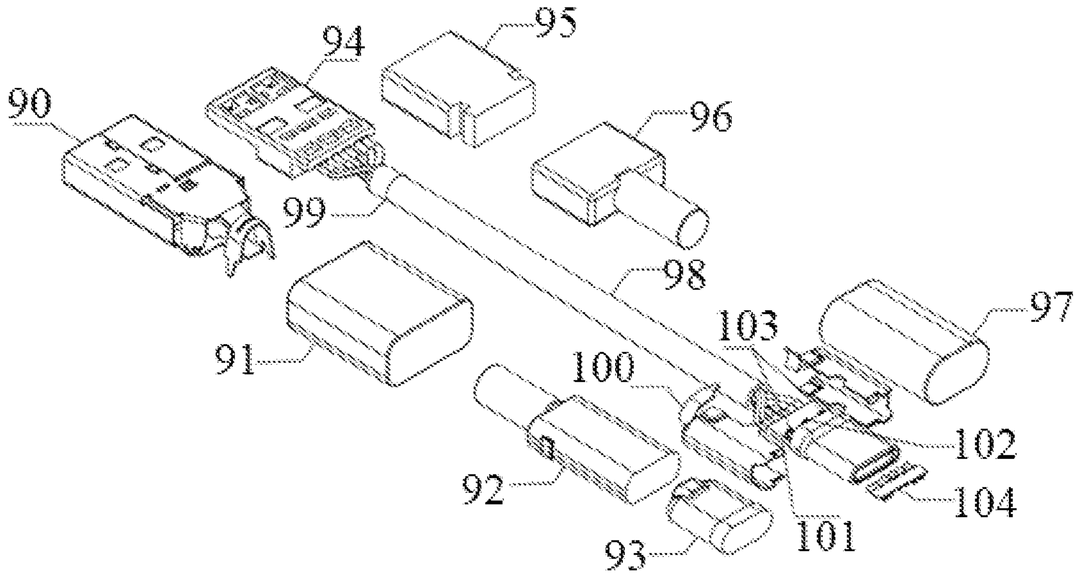
FIG. 7 shows an exploded view of a data cable according to an embodiment of this application.

FIG. 7 is an exploded view of a data cable according to an embodiment of this application. The data cable includes:

- an iron housing 90 at an AM port, configured to increase an anti-pressure capability and electromagnetic shielding of a connector, reducing external radiation of an internal electromagnetic signal;
- an external mold 91 at the AM port, configured to prevent water and dust from entering;
- a Strain Relief (SR) internal mold 92 at a Type-C port, configured to increase a swing resistance capability of a wire;
- an internal mold 93 at the Type-C port, configured to protect an internal solder joint and prevent water vapor from entering;
- a rubber core and a terminal 94 at the AM port, configured for signal connection and power connection;
- an internal mold 95 at the AM port, configured to protect an internal solder joint and prevent water vapor from entering;
- an SR internal mold 96 at the AM port, configured to increase a swing resistance capability of a wire;
- an external mold 97 at the Type-C port, configured to prevent water and dust from entering;
- a wire 98, configured to provide connections for connectors at two ends;
- a copper foil 99, configured to wrap a reflexed external grounding wire, enable an AM rivet jaw to be riveted and pressed on the external grounding wire, and enable the AM to be short-circuited with the external grounding wire;
- an iron housing 100 at the Type-C port and an iron housing on the left and right of the Type-C port, configured to increase an anti-pressure capability of a Type-C connector and shield an electromagnetic signal;
- a PCB 101 at the Type-C port, configured to connect a wire and a connector;
- a resistor 102, namely, a pull-up 56KΩ resistor, configured to communicate with a mobile phone and recognize a wire;
- a capacitor 103, namely, a filtering capacitor, connected to an iron housing point GND, and configured to reduce external radiation of electromagnetic waves from the iron housing of the Type-C port; and
- a photosensitive glue (UV glue) 104, configured to protect a solder joint, increase a tension capability of a wire, and prevent water vapor from entering the solder joint, resulting in tin migration.

To sum up, in this embodiment of this application, a conductive fastener is added to the AM connector, and the conductive fastener is connected to the grounding port pad to achieve a grounding effect of the AM connector. The metal fastener is in contact with the conductive housing, to implement short circuit between the AM connector and the conductive fastener. Therefore, the external grounding wire is not to be twisted and stained with tin at an AM port, so that working time may be reduced; no copper foil is to be wrapped at the AM port, so that a material and working time may be reduced; and no tin is to be increased manually after riveting and pressing to ensure stability of AM contact, so that working time may be reduced.

At least one embodiment of this application further provides an electronic device. The electronic device includes an electronic device body and the foregoing data cable.

The data cable is removably connected to the electronic device body.

For example, in a case that the electronic device body is electrically connected to the data cable, a power supply end charges the electronic device body by using the data cable, or another device reads stored data of the electronic device body by using the data cable.

It should be noted that, in this specification, the terms "include", "comprise", or any other variant thereof are intended to cover a non-exclusive inclusion, so that a process, a method, an article, or an apparatus that includes a list of elements not only includes those elements but also includes other elements which are not expressly listed, or further includes elements inherent to such process, method, article, or apparatus. In absence of more constraints, an element preceded by "includes a . . . " does not preclude the existence of other identical elements in the process, method, article, or apparatus that includes the element. Furthermore, it should be noted that the scope of the methods and apparatuses in the implementations of this application is not limited to performing the functions in the order shown or discussed, but may also include performing the functions in a substantially simultaneous manner or in a reverse order depending on the functions involved. For example, the described methods may be performed in an order different from that described, and various steps may be added, omitted, or combined. In addition, features described with reference to some examples may be combined in other examples.

The embodiments of this application are described with reference to the accompanying drawings. However, this application is not limited to the foregoing implementations. The foregoing implementations are merely examples, but are not limiting. Under the enlightenment of this application, a person of ordinary skill in the art may make many forms without departing from the objective and the scope of the claims of this application, and these forms all fall within the protection scope of this application.

The foregoing descriptions are merely exemplary implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A data cable, comprising: a Type-A male (AM) connector, a Type C connector, and a connection cable, wherein two ends of the connection cable are respectively electrically connected to the AM connector and the Type C connector, and the AM connector comprises:

a conductive housing and a rubber core; and a power port pad, a signal port pad, a grounding port pad, and a conductive fastener that are disposed on the rubber core, and the grounding port pad is electrically connected to an inner grounding wire of the connection cable, wherein the connection cable comprises:

an aluminum foil layer configured to shield an electromagnetic wave, the aluminum foil layer being disposed around to form accommodation space; and power cables, two signal cables, and inner grounding wires disposed in the accommodation space, wherein the power cables are configured to provide a power supply, and the two signal cables are configured to transmit a USB signal; the inner grounding wires are disposed between the two signal cables, and are respectively connected to the two signal cables and an inner surface of the aluminum foil, and the inner grounding wires are configured to provide loop current for the power supply and provide a reference ground for the two signal cables, and wherein the conductive fastener is connected to the grounding port pad, and the conductive fastener is in contact with the conductive housing.

2. The data cable according to claim 1, wherein a first groove is provided at the grounding port pad, a clamping part is disposed on the conductive fastener, and the clamping part is disposed in the first groove.

3. The data cable according to claim 1, wherein the conductive fastener is of a U-shaped structure, and the conductive fastener comprises:

a first surface and a second surface that are disposed opposite to each other, wherein the first surface and the second surface are respectively provided with through holes; and protrusions corresponding to the through holes that are further disposed on the rubber core, and the through holes match the protrusions to dispose the conductive fastener on the rubber core.

4. The data cable according to claim 3, wherein the conductive fastener of the U-shaped structure further comprises:

a third surface connecting the first surface and the second surface, wherein the third surface of the conductive fastener is in contact with the conductive housing.

5. The data cable according to claim 1, wherein the conductive fastener is welded to the conductive housing.

6. The data cable according to claim 1, wherein the number of the power cables is two, and the number of the inner grounding wires is two.

7. The data cable according to claim 1, wherein the power port pad is electrically connected to the power cables of the connection cable; and the signal port pad is electrically connected to the signal cables of the connection cable.

8. The data cable according to claim 1, wherein the connection cable further comprises:

a nylon rope disposed in the accommodation space, wherein the nylon rope is configured to fill a gap in the accommodation space.

9. The data cable according to claim 1, wherein the connection cable further comprises:

a wire outer sheath that covers the aluminum foil layer, wherein the wire outer sheath is configured to protect an internal structure of the connection cable.

10. An electronic device, comprising an electronic device body and a data cable, wherein the data cable is removably connected to the electronic device body, and the data cable comprises a Type-A male (AM) connector, a Type C connector, and a connection cable, wherein two ends of the connection cable are respectively electrically connected to the AM connector and the Type C connector, and the AM connector comprises:

a conductive housing and a rubber core; and a power port pad, a signal port pad, a grounding port pad, and a conductive fastener that are disposed on the rubber core, and the grounding port pad is electrically connected to an inner grounding wire of the connection cable, wherein the connection cable comprises:

an aluminum foil layer configured to shield an electromagnetic wave, the aluminum foil layer being disposed around to form accommodation space; and power cables, two signal cables, and inner grounding wires disposed in the accommodation space, wherein the power cables are configured to provide a power supply, and the two signal cables are configured to transmit a USB signal; the inner grounding wires are disposed between the two signal cables, and are respectively connected to the two signal cables and an inner surface of the aluminum foil, and the inner grounding wires are configured to provide loop current for the power supply and provide a reference ground for the two signal cables, and wherein the conductive fastener is connected to the grounding port pad, and the conductive fastener is in contact with the conductive housing.

11. The electronic device according to claim 10, wherein a first groove is provided at the grounding port pad, a clamping part is disposed on the conductive fastener, and the clamping part is disposed in the first groove.

12. The electronic device according to claim 10, wherein the conductive fastener is of a U-shaped structure, and the conductive fastener comprises:

a first surface and a second surface that are disposed opposite to each other, wherein the first surface and the second surface are respectively provided with through holes; and protrusions corresponding to the through holes that are further disposed on the rubber core, and the through holes match the protrusions to dispose the conductive fastener on the rubber core.

13. The electronic device according to claim 12, wherein the conductive fastener of the U-shaped structure further comprises:

a third surface connecting the first surface and the second surface, wherein the third surface of the conductive fastener is in contact with the conductive housing.

14. The electronic device according to claim 10, wherein the conductive fastener is welded to the conductive housing.

15. The electronic device according to claim 10, wherein the number of the power cables is two, and the number of the inner grounding wires is two.

16. The electronic device according to claim 10, wherein the power port pad is electrically connected to the power cables of the connection cable; and the signal port pad is electrically connected to the signal cables of the connection cable.

17. The electronic device according to claim 10, wherein the connection cable further comprises:

a nylon rope disposed in the accommodation space, wherein the nylon rope is configured to fill a gap in the accommodation space.

18. The electronic device according to claim 10, wherein the connection cable further comprises:

a wire outer sheath that covers the aluminum foil layer, wherein the wire outer sheath is configured to protect an internal structure of the connection cable.

* * * * *